(12) United States Patent
Shaked et al.

(10) Patent No.: US 11,444,754 B1
(45) Date of Patent: Sep. 13, 2022

(54) TENANT LEVEL ENCRYPTION

(71) Applicant: monday.com Ltd., Tel Aviv (IL)

(72) Inventors: Dotan Shaked, Hod Hasharon (IL); Daniel Mittelman, Tel Aviv (IL); Eviathar Moussaffi, Tel Aviv (IL); Eran Amiel, Tel-Aviv (IL); Eilon Moalem, Tel-Aviv (IL)

(73) Assignee: monday.com Ltd., Tel Aviv (IL)

( * ) Notice: Subject to any disclaimer, the term of this patent is extended or adjusted under 35 U.S.C. 154(b) by 0 days.

(21) Appl. No.: 17/565,690

(22) Filed: Dec. 30, 2021

(51) Int. Cl.
  *H04L 9/08* (2006.01)

(52) U.S. Cl.
  CPC ............ *H04L 9/083* (2013.01); *H04L 9/0822* (2013.01); *H04L 9/0891* (2013.01); *H04L 9/0894* (2013.01)

(58) Field of Classification Search
  CPC ..... H04L 9/083; H04L 9/0822; H04L 9/0891; H04L 9/0894
  See application file for complete search history.

(56) References Cited

U.S. PATENT DOCUMENTS

| | | | | |
|---|---|---|---|---|
| 9,379,890 B1* | 6/2016 | Blakely | ............... | H04L 9/0822 |
| 10,003,584 B1* | 6/2018 | Roth | ..................... | H04L 63/068 |
| 10,211,977 B1* | 2/2019 | Roth | ..................... | H04L 9/0897 |
| 11,146,382 B2* | 10/2021 | Lapworth | ............. | G06F 21/602 |
| 2012/0179909 A1* | 7/2012 | Sagi | ..................... | H04L 9/0872 |
| | | | | 713/167 |
| 2014/0372750 A1* | 12/2014 | Antonenkov | ........... | H04L 63/06 |
| | | | | 713/165 |
| 2021/0036851 A1* | 2/2021 | Villapakkam | ....... | G06F 21/6218 |
| 2022/0021524 A1* | 1/2022 | Peddada | ............... | H04L 9/0894 |

* cited by examiner

*Primary Examiner* — Henry Tsang (57) ABSTRACT

There is provided a computer implemented method encrypting and/or decrypting data, comprising: accessing data for encryption and/or decryption, wherein the data is of a user account of a plurality of user accounts, obtaining an account key in an encrypted state, the account key is obtained from an account key dataset storing at least one encrypted account key for each of the user accounts, providing over the network, the encrypted account key to a key management system(s) (KMS) hosted by a server, receiving over the network, a decrypted account key from the server hosting the KMS(s), wherein the KMS(s) decrypts the encrypted account key using an organization key stored and managed by the KMS(s), storing the decrypted account key in a data storage device set to provide temporary storage for decrypted account keys, and encrypting and/or decrypting the data associated with the user account using the decrypted account key.

16 Claims, 5 Drawing Sheets

TENANT LEVEL ENCRYPTION

BACKGROUND

The present invention, in some embodiments thereof, relates to cybersecurity and, more specifically, but not exclusively, to management of keys for encryption of data of multiple different users.

Data is encrypted and decrypted using cryptographic keys. Key management systems manage the keys, including for example features such as generation of keys, exchange of keys, storage of keys, destruction of keys, and encryption and decryption of data using the keys.

SUMMARY

According to a first aspect, a computer implemented method of at least one of encrypting and decrypting data, comprises: accessing data for at least one of encryption and decryption, wherein the data is of a user account of a plurality of user accounts, obtaining an account key in an encrypted state, the account key is obtained from an account key dataset storing at least one encrypted account key for each of the plurality of user accounts, providing over the network, the encrypted account key to at least one key management system (KMS) hosted by a server, receiving over the network, a decrypted account key from the server hosting the at least one KMS, wherein the at least one KMS decrypts the encrypted account key using an organization key stored and managed by the at least one KMS, storing the decrypted account key in a data storage device set to provide temporary storage for decrypted account keys, and at least one of encrypting and decrypting the data associated with the user account using the decrypted account key.

According to a second aspect, a system for at least one of encryption and decryption of data, comprising: at least one processor executing a code for: accessing data for at least one of encryption and decryption, wherein the data is of a user account of a plurality of user accounts, obtaining an account key in an encrypted state, the account key is obtained from an account key dataset storing at least one encrypted account key for each of the plurality of user accounts, providing over the network, the encrypted account key to at least one key management system (KMS) hosted by a server, receiving over the network, a decrypted account key from the server hosting the at least one KMS, wherein the at least one KMS decrypts the encrypted account key using an organization key stored and managed by the at least one KMS, storing the decrypted account key in a data storage device set to provide temporary storage for decrypted account keys, and at least one of encrypting and decrypting the data associated with the user account using the decrypted account key.

According to a third aspect, a non-transitory medium storing program instructions for at least one of encryption and decryption of data, which, when executed by a processor, cause the processor to: access data for at least one of encryption and decryption, wherein the data is of a user account of a plurality of user accounts, obtain an account key in an encrypted state, the account key is obtained from a key dataset storing at least one encrypted account key for each of the plurality of user accounts, provide over the network, the encrypted account key to at least one key management system (KMS) hosted by a server, receive over the network, a decrypted account key from the server hosting the at least one KMS, wherein the at least one KMS decrypts the encrypted account key using an organization key stored and managed by the at least one KMS, store the decrypted account key in a data storage device set to provide temporary storage for decrypted account keys, and at least one of encrypt and decrypt the data associated with the user account using the decrypted account key.

In a further implementation form of the first, second, and third aspects, the data storage device set to provide temporary storage is implemented as at least one of: a cache, and a volatile memory.

In a further implementation form of the first, second, and third aspects, the organizational key is used to encrypt and decrypt a plurality of account keys of a plurality of user accounts.

In a further implementation form of the first, second, and third aspects, the at least one KMS and the organizational key are provided by the user account.

In a further implementation form of the first, second, and third aspects, the data storage device set to provide temporary storage includes at least one of: an eviction policy for evicting decrypted account keys stored thereon, reset of the data storage device at a preset event for deleting decrypted account key stored thereon, a mechanism set to remove decrypted account key stored therein on when a timer expires, and a manual trigger set to remove decrypted account keys stored thereon in response to a manual indication by a user.

In a further implementation form of the first, second, and third aspects, further comprising: generating the account key for the user account, wherein the account key comprises a new account key for the user account, providing over the network, the new account key to the at least one KMS, wherein the new account key is in a decrypted state, receiving over the network, at least one encrypted versions of the new account key, each respective encrypted version of the new account key created by the at least one KMS using a respective unique organizational key stored and managed by the KMS, and storing the at least one encrypted versions of the new account key in the account key dataset in association with the user account, wherein the at least one encrypted versions of the new account key provide redundancy for the account key.

In a further implementation form of the first, second, and third aspects, decryption of each of the at least one encrypted version of the new account key using the respective unique organization key generates a same key.

In a further implementation form of the first, second, and third aspects, further comprising: detecting at least one of an error and a security breach of one of the encrypted versions of the new account key, and in response to the detected at least one of error and security breach, using another of the encrypted versions of the new account key.

In a further implementation form of the first, second, and third aspects, the at least one of error and a security breach is detected in response to attempted decryption of the encrypted account key.

In a further implementation form of the first, second, and third aspects, further comprising using the same decrypted account key stored in the data storage device, to at least one of encrypt and decrypt a plurality of data items associated with the user account, without performing additional decryptions of the account key by the at least one KMS for the plurality of data items.

In a further implementation form of the first, second, and third aspects, encrypting the data comprises encrypting the data using an ad-hoc initialization vector for ensuring that a same data for encryption generates two different encrypted data items.

In a further implementation form of the first, second, and third aspects, at least one of: (i) when the data is for encryption, the account key is obtained from the account key dataset according to an account key ID associated with the user account, and the account key ID is attached to the encrypted data, and (ii) when the data comprises encrypted data for decryption, the account key ID attached to the encrypted data is extracted, and the account key is obtained from the account key dataset using the extracted account key ID.

In a further implementation form of the first, second, and third aspects, in response to the decrypted account key existing in the data storage device, the data is at least one of encrypted and decrypted using the decrypted account key without obtaining the account key in an encrypted state.

In a further implementation form of the second, and third aspects, the at least one processor is of at least one server providing software as a service (SAAS) for encryption and decryption of data associated with the user account over a network to a plurality of client terminals.

In a further implementation form of the second, and third aspects, the data for at least one of encryption and decryption is not transferred over the network between the at least one processor and the server hosting the at least one KMS, wherein the data for at least one of encryption and decryption is shared between a plurality of processors and not stored locally by any of the plurality of processors.

In a further implementation form of the second, and third aspects, the at least one of encryption and decryption of the data associated with the user account is performed by the at least one processor, wherein the at least one of encryption and decryption of the data associated with the user account is not performed by the at least one KMS.

In a further implementation form of the second, and third aspects, the data storage device comprises a first data storage device, wherein the account key dataset is locally stored on a second data storage device, wherein the first and second data storage devices are locally installed with respect to the at least one processor for providing fast access times, wherein the first and second data storage devices are not accessed by the server hosting the at least one KMS.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to cybersecurity and, more specifically, but not exclusively, to management of keys for encryption of data of multiple different users.

An aspect of some embodiments of the present invention relates to systems, methods, devices, and/or code instructions (e.g., stored on a memory and executable by one or more hardware processors) for management of account keys for encrypting and/or decrypting data. An account key in an encrypted state is obtained from an account key dataset. The account key dataset stores one or more encrypted account keys for each user accounts. The encrypted account keys stored in the account key dataset have been encrypted by one or more key management systems (KMS) hosted by a server, in response to the account key being provided to the KMS over a network in an unencrypted state. The encrypted account key is provided over the network to the KMS. The KMS decrypts the encrypted account key using an organization key stored and managed by the KMS. The same organization key may be used by the KMS for encryption and/or decryption of multiple account keys of the same user account, and/or of one or more account keys of different user accounts, which reduces the total number of keys that the KMS manages. The account key is the decrypted state is obtained over the network from the KMS. The decrypted account key is stored on a data storage device set to provide temporary storage for decrypted account keys and/or set to provide fast access to decrypted account keys, for example, a cache and/or a volatile memory. The data associated with the user account is encrypted and/or decrypted using the decrypted account key. Additional data associated with the user account is encrypted and/or decrypted using the decrypted account key temporarily stored in the data storage device, which reduces the computational and/or network overhead involved in accessing the KMS. Decrypted account keys temporarily stored in the data storage device are removed, for example, by a cache clearance mechanism, a reset of the volatile memory, and/or other approaches, which reduces likelihood of the decrypted account keys being accessed by malicious entities.

At least some implementations of the systems, methods, computing devices, and code instructions (i.e., stored on a data storage device and executable by one or more hardware processors) described herein address the technical problem of managing a large number of cryptographic keys, optionally by a computing device that provides tenant level encryption (TLE) services where each user account is provided with one or more dedicated keys for encrypting and decrypting data associated with the respective user account. Providing each user account with their own dedicated key(s) provides protection against viewing of data by unauthorized entities. However, providing each user account with their own dedicated key(s) requires management of a large number of keys, at least as many as the number of user account, or greater in cases where each user account is allocated multiple keys. Moreover, account keys are extremely private, and a secure system is required to securely manage the account key(s) to prevent the account keys from being obtained by malicious entities. Traditional key management systems (KMS) manage such account keys for uses. However, traditional KMS are able to manage a relative low number of account keys, for example, on the order of tens, hundreds, and sometimes thousands, for example, below about 10, or 100, or 1000, or 10000. Such traditional KMS are unable to scale to manage large number of account keys, for example, to provide a software as a service (SAAS). For example, such traditional KMS cannot manage tens or thousands, hundreds of thousands, or millions of account keys, for example, over 100000, or over 1000000, or over 10000000, and the like. Such traditional KMS, which are cloud based and/or server based, incur performance problems when the number of account keys being managed increases, for example, high load on the processors of the server(s) and/or cloud managing the account keys and/or performing encryption and/or decryption using the account keys, and/or high traffic on a network providing connectivity between the server(s) and/or cloud and the client terminals. The high load on the processor(s) and/or high traffic on the network may arise, for example, from the current architecture and/or services provided by traditional KMS. The data is transferred over the network to be encrypted and/or decrypted by the account keys managed by the traditional KMS. When the number of account keys is higher than that traditionally supported by the KMS, (e.g., due to a high number of user accounts), the load on the server(s) and/or cloud and/or network is excessive, resulting in degraded performance or overload.

At least some implementations of the systems, methods, computing devices, and code instructions (i.e., stored on a data storage device and executable by one or more hardware processors) described herein address the above mentioned technical problem, and/or improve the technical field of cybersecurity, in particular the sub-field of improving a system and/or method that securely manages account keys. The solution to the technical problem, and/or the improvement to the technical field, is in the ability to manage a large number of account keys (as discussed above) in a computationally efficient manner, without excessive load on the processor(s) of the server and/or cloud and/or without excessive network traffic on the network connecting the server and/or cloud with client terminals used by the users to access their accounts and/or transfer data for encryption and/or decryption.

In at least some embodiments, the technical solution and/or the improvement to the technical field is based on an architecture where account keys are stored in an encrypted state in a local encrypted account key dataset, for example, stored on a data storage device of a server(s). The local storage of the dataset of encrypted account keys provides easy and/or fast access to the account keys. Storage of the account keys in the encrypted state provides security of the account keys themselves, since the encrypted account keys are useless to a malicious entity that gains access to the dataset. The KMS is used to encrypt the account keys which are stored in the encrypted account key dataset. To encrypt and/or decrypt data of a user account, the encrypted account key is provided to the KMS. The KMS decrypts the encrypted account key using an organization key. The decrypted account key is used to decrypt and/or encrypt the data of the user account. The decrypted account key is temporarily stored in a temporary data storage device of the computing device performing the encryption and/or decryption, for example, a cache and/or volatile memory. The temporarily stored decrypted account key is rapidly accessed for encryption and/or decryption of data. The decrypted account key may be removed from the temporary data storage. The short-lived decrypted account key provides security, by reducing the likelihood that a malicious entity is able to access the decrypted account key.

In at least some embodiments, the technical solution and/or the improvement to the technical field is based on the data provided (e.g., by client terminal(s)) for encryption and/or decryption not being transferred over a network between a processor (and/or computing device) and the KMS server hosting the KMS. The encryption and/or decryption of the data is performed by the processor (and/or computing device), and is not performed by the KMS. This approach helps improve security, by reducing risk of a security breach of the data, as the data is transferred over the network, and/or at the KMS server. Avoiding sending the data to the KMS server is in contrast to standard approaches, where the data for encryption and/or decryption is provided over the network to the KMS server, which performs the encryption and/or decryption, which is provide to security breaches, such as a malicious entity accessing the data. Moreover, the data for encryption and/or decryption may be shared between multiple processors and/or multiple computing devices (e.g., arranged for distributed processing), without being stored locally in a permanent manner by any of processors and/or devices. It is noted that data may be temporarily stored, for example, in a cache and/or volatile memory, for the time interval needed to enable encryption and/or decryption of the data, and then removed from the temporary storage, which reduces risk of security breaches.

In at least some embodiments, the technical solution and/or the improvement to the technical field is based on the KMS managing organization keys that are used to encrypt and/or decrypt multiple account keys of one or more user accounts. The same organization key may be used for multiple user accounts. This reduces the total number of organization keys that are managed by the KMS, for example, in comparison to standard approaches where a single organization key is used per user account and/or per account key, which does not scale when there are a large number of user accounts and/or keys, for example, in terms of increased network traffic, increased computational load and/or increased data storage for allocation, on the KMS server and/or on the server providing the encryption and/or decryption services. Moreover, using different organization keys to encrypt multiple versions of the same account key for the same user account, to create multiple encrypted versions of the account key, provides redundancy. When one of the encrypted account keys is lost and/or an error is detected, another encrypted account key may be used, since the decrypted account key is the same for both versions. Redundancy is provided to prevent a situation where all encrypted data is lost due to loss and/or error of a single encrypted account key which cannot be decrypted.

Figure 3:
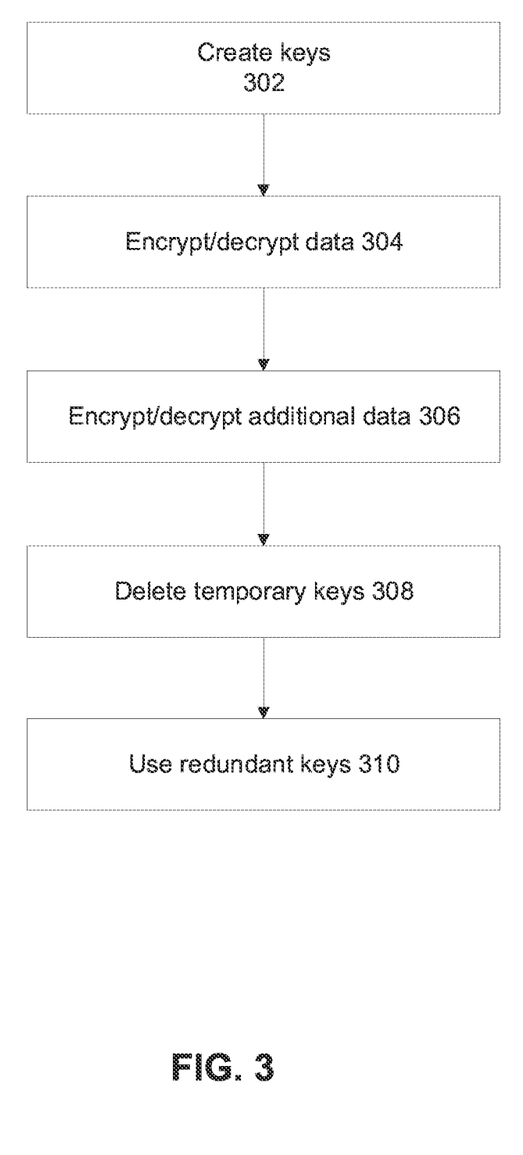
FIG. 3 is a flowchart of a high level process for encryption and/or decryption of data using encrypted account keys stored in an encrypted account dataset and the decrypted account keys stored in a temporary storage (e.g., cache, memory), where a KMS performs encryption and/or decryption of the account keys using organization keys, in accordance with some embodiments of the present invention.

In at least some embodiments, the technical solution and/or the improvement to the technical field is based on additional data item(s) associated with the same user account being encrypted and/or decrypted using the same decrypted account key (used to encrypt and/or decrypt the data obtained in 304), which is stored in the data storage device (e.g., memory, volatile memory, cached). The additional data item(s) are encrypted and/or decrypted without accessing the KMS for performing additional decryptions of the account key. Using the same decrypted key without accessing the KMS, increases computational performance and/or improves data storage utilization, of the computing device performing the encryption and/or decryption and/or of the KMS.

It is noted that performance improvements described herein are in addition to reduction in overhead of the actual encrypt and/or decrypt operations, which may be optimized by using available packages and/or processes.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
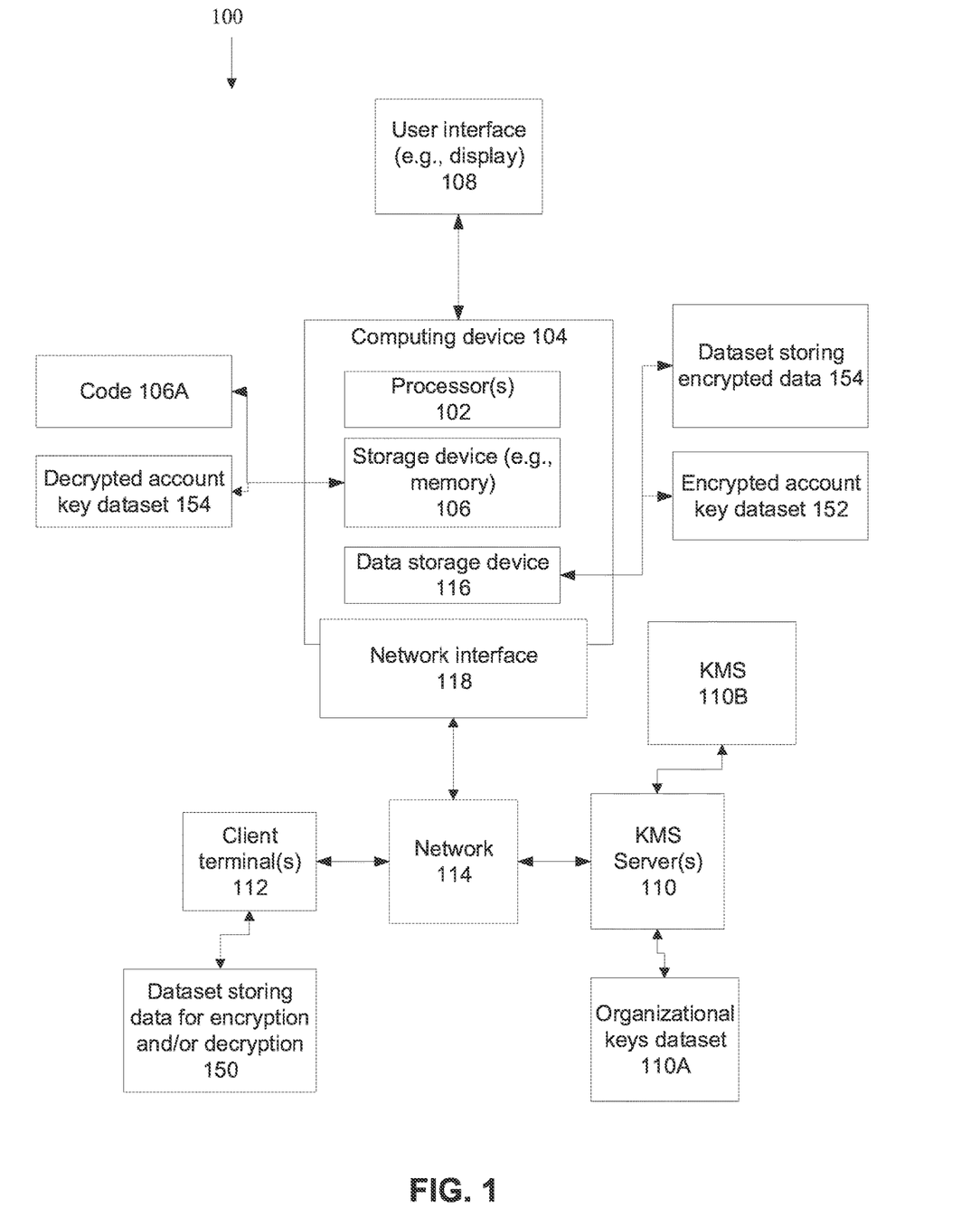
FIG. 1 is a block diagram of components of a system for encryption and/or decryption of data using encrypted account keys stored in an encrypted account dataset and the decrypted account keys stored in a temporary storage (e.g., cache, memory), where a KMS performs encryption and/or decryption of the account keys using organization keys, in accordance with some embodiments of the present invention.
Figure 2:
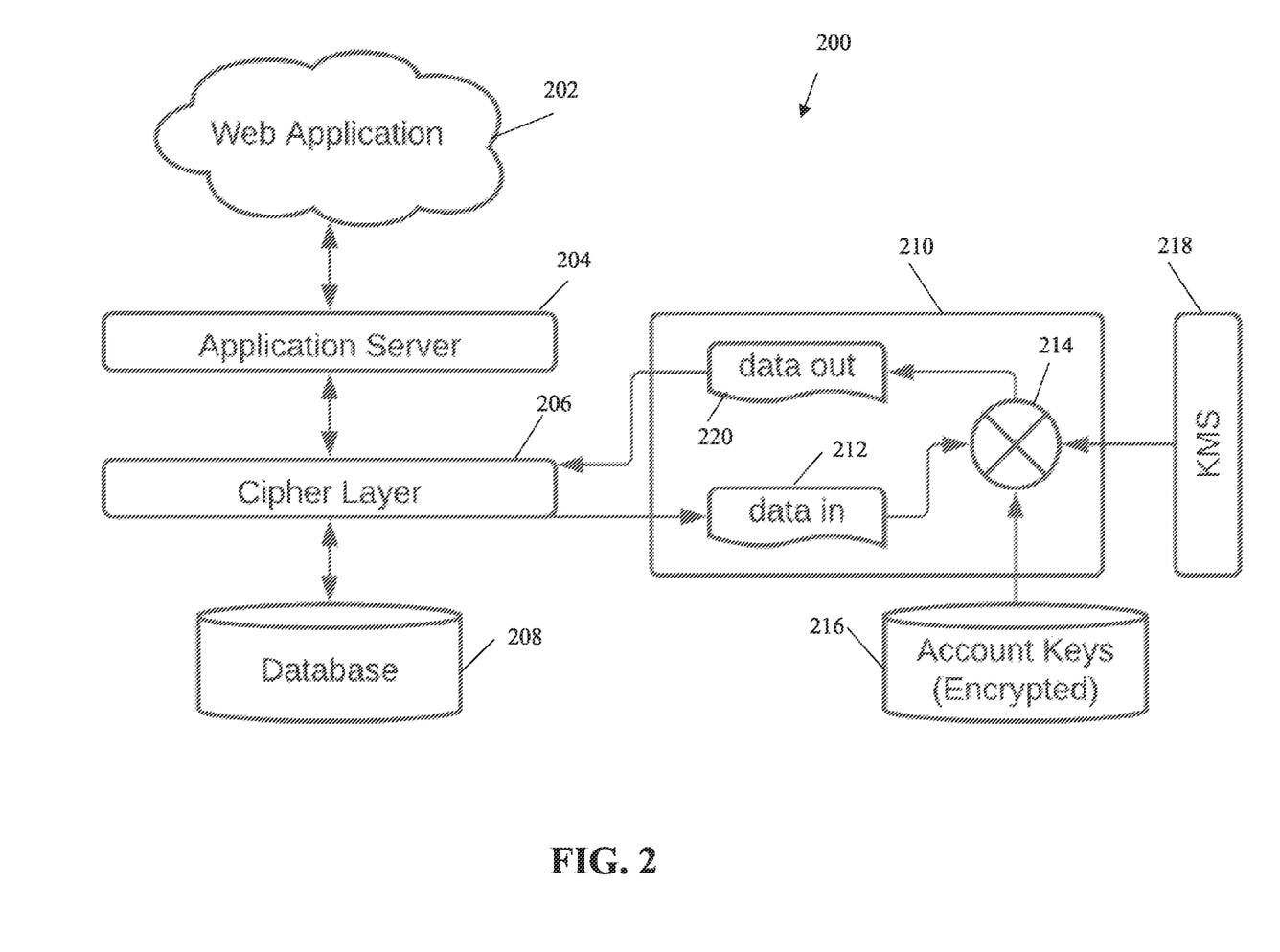
FIG. 2 is a flowchart of a method of encryption and/or decryption of data using encrypted account keys stored in an encrypted account dataset and the decrypted account keys stored in a temporary storage (e.g., cache, memory), where a KMS performs encryption and/or decryption of the account keys using organization keys, in accordance with some embodiments of the present invention.
Figure 4:
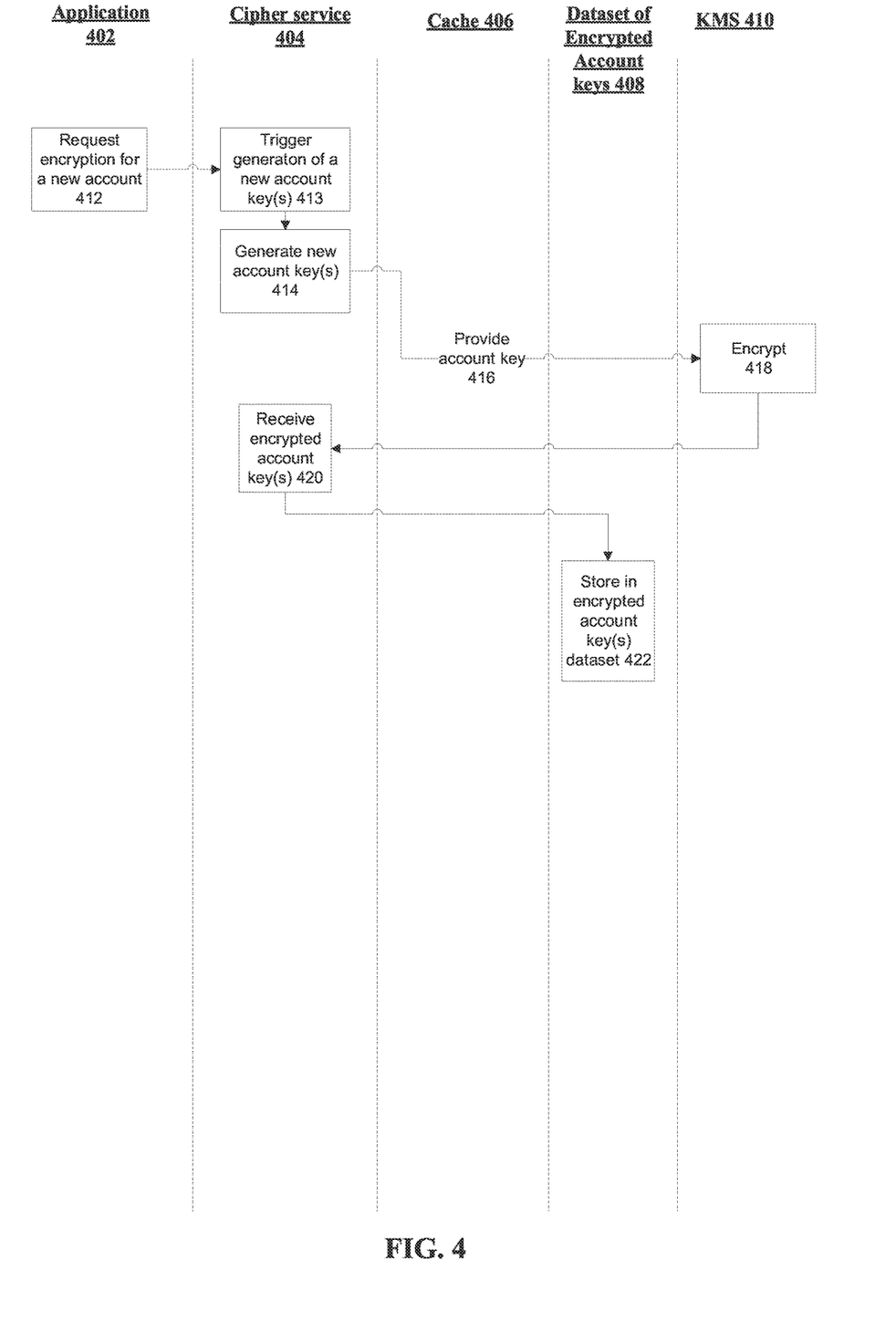
FIG. 4 is a dataflow diagram depicting an exemplary process for creating new account keys, in accordance with some embodiments of the present invention.
Figure 5:
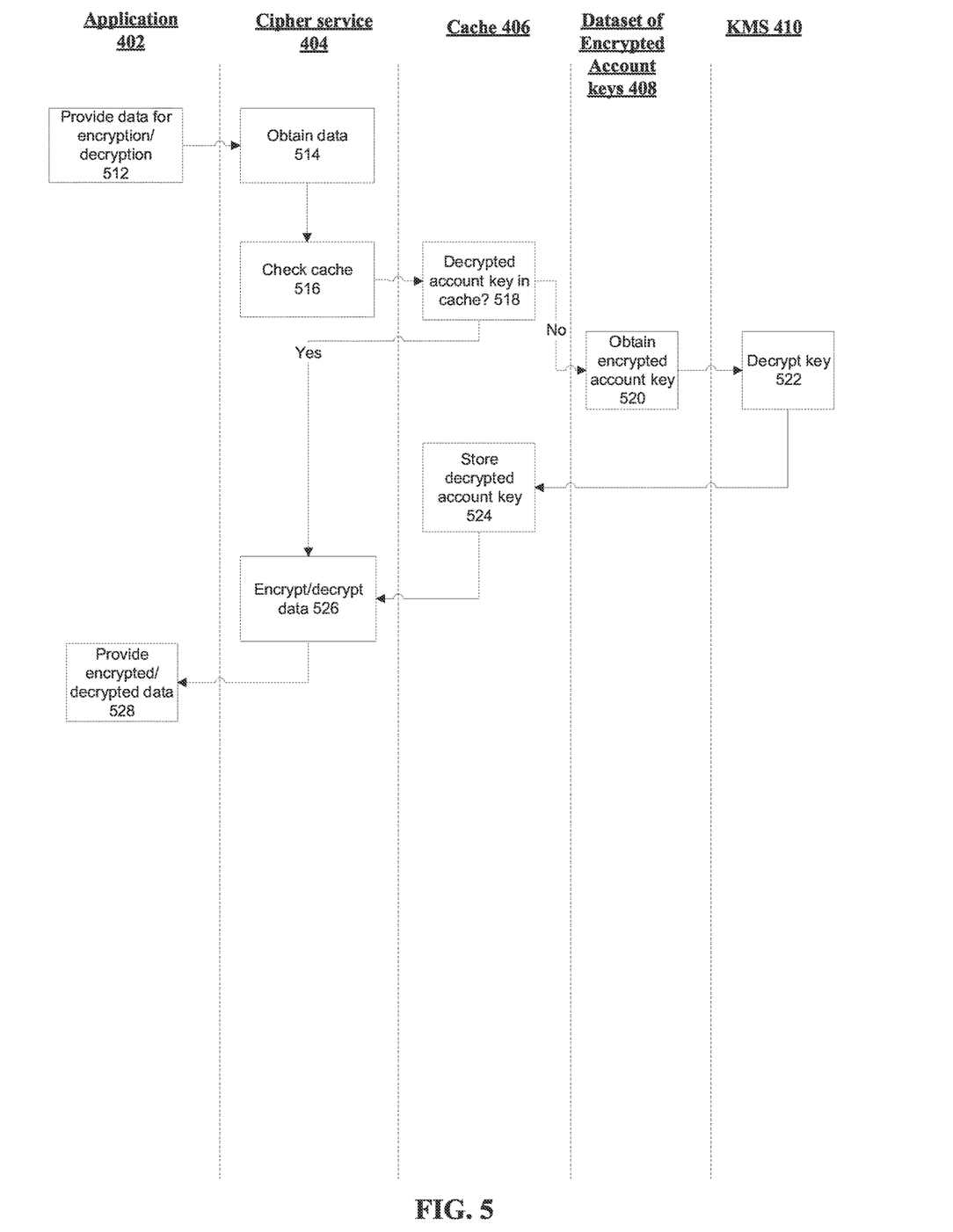
FIG. 5 is an exemplary dataflow diagram depicting an exemplary process for encryption and/or decryption of data using encrypted account keys stored in an encrypted account dataset and the decrypted account keys stored in a temporary storage (e.g., cache, memory), where a KMS performs encryption and/or decryption of the account keys using organization keys, in accordance with some embodiments of the present invention.

Reference is now made to FIG. 1, which is a block diagram of components of a system 100 for encryption and/or decryption of data using encrypted account keys stored in an encrypted account dataset 152 and the decrypted account keys stored in a temporary storage 106 (e.g., cache, memory), where a KMS 110B performs encryption and/or decryption of the account keys using organization keys, in accordance with some embodiments of the present invention. Reference is also made to FIG. 2, which is a flowchart of a method of encryption and/or decryption of data using encrypted account keys stored in an encrypted account dataset and the decrypted account keys stored in a temporary storage (e.g., cache, memory), where a KMS performs encryption and/or decryption of the account keys using organization keys, in accordance with some embodiments of the present invention. Reference is also made to FIG. 3, which is a flowchart of a high level process for encryption and/or decryption of data using encrypted account keys stored in an encrypted account dataset and the decrypted account keys stored in a temporary storage (e.g., cache, memory), where a KMS performs encryption and/or decryption of the account keys using organization keys, in accordance with some embodiments of the present invention. Reference is also made to FIG. 4, which is a dataflow diagram depicting an exemplary process for creating new account keys, in accordance with some embodiments of the present invention. Reference is also made to FIG. 5, which is an exemplary dataflow diagram depicting an exemplary process for encryption and/or decryption of data using encrypted account keys stored in an encrypted account dataset and the decrypted account keys stored in a temporary storage (e.g., cache, memory), where a KMS performs encryption and/or decryption of the account keys using organization keys, in accordance with some embodiments of the present invention.

The account keys and/or the organizational keys may be implemented as symmetric keys.

System 100 may implement the acts of the method described with reference to FIGS. 3-5, by processor(s) 102 of a computing device 104 executing code instructions 106A stored in a data storage device 106 (also referred to as a memory and/or program store).

Computing device 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Multiple architectures of system 100 based on computing device 104 may be implemented. In an exemplary implementation, computing device 104 storing code 106A may be implemented as one or more servers (e.g., network server, web server, a computing cloud, a virtual server) that provides centralized services (e.g., one or more of the acts described with reference to FIGS. 3-5) to one or more client terminals 112 over a network 114, for example, providing software as a service (SaaS) to the client terminal(s) 112, providing software services accessible using a software interface (e.g., application programming interface (API), software development kit (SDK)), providing an application for local download to the client terminal(s) 112, and/or providing functions using a remote access session to the client terminals 112, such as through a web browser. For example, as described herein, computing device 104 centrally performs encryption and/or decryption of data (e.g., of dataset 150 provided by client terminal(s) 112 and/or of data provided by another source) of multiple user accounts which may be provided by multiple client terminals 112. Encrypted data may be locally stored on computing device 104, for example, in dataset 154. It is noted that decrypted data is not necessarily stored in a database by computing device 104, apart from optional temporary storage as described herein. The encrypted and/or decrypted data may be provided to respective client terminals 112 that own the respective data. The encryption and/or decryption of data is done by computing device 104 using decrypted keys stored in a decrypted key dataset 154. The keys, which are initially encrypted, as stored in encrypted dataset 152. The encrypted key corresponding to a certain user account is obtained from dataset 152, and provided to KMS server(s) 110 over network 114 by computing device 104. KMS server(s) 110 hosts KMS 110B, which decrypts the encrypted key using an organization key stored in an organization key dataset 110A. KMS server(s) 110 provides the decrypted key to computing device 104. The decrypted key is stored in decrypted key dataset 154 in its decrypted form, for a temporary amount of time, as described herein.

In another exemplary implementation, computing device 104 provides local and/or non-centralized services to one or more user accounts set up on computing device 104. Computing device 104 may include locally stored software (e.g., code 106A) that performs one or more of the acts described with reference to FIGS. 3-5, for example, as a self-contained client terminal that is designed to be used by users of the client terminal. In such implementation, computing device 104 locally performs encryption and/or decryption of data (e.g., of dataset 150 provided by the client terminal(s) and/or of data provided by another source) for one or more user accounts of users using the client terminals. Encrypted data may be locally stored on computing device 104, for example, in dataset 154. It is noted that decrypted data is not necessarily stored in a database by computing device 104, apart from optional temporary storage as described herein. The encryption and/or decryption of data is done by computing device 104 using decrypted keys stored in a decrypted key dataset 154. The keys, which are initially encrypted, as stored in encrypted dataset 152. The encrypted key corresponding to a certain user account is obtained from dataset 152, and provided to KMS server(s) 110 over network 114 by computing device 104. KMS server(s) 110 decrypts the encrypted key using an organization key stored in an organization key dataset 110A. Organization keys stored in organization key dataset 110A are used to encrypt and/or decrypt multiple account keys of one or more user accounts. KMS server(s) 110 provides the decrypted key to computing device 104. The decrypted key is stored in decrypted key dataset 154 in its decrypted form, for a temporary amount of time, as described herein.

Optionally, processor(s) 102 is of a server implementation of computing device 104, that provides software as a service (SAAS) for encryption and/or decryption of data. The SAAS may be provided over a network to multiple client terminals and/or servers, for example, via an API, SDK, web browser, remote access, and/or other remote virtual interfaces. This provides client terminals and/or servers with the ability to secure their data, without requiring user accounts to perform complex key management, for example, according to defined keys management guideline to ensure security and/or reduce risk of security breaches.

Processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Data storage device 106 stores code instructions executable by processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 106 stores code 106A that implements one or more features and/or acts of the method described with reference to FIGS. 3-5 when executed by processor(s) 102.

Decrypted key dataset 154 which temporarily stores keys in the decrypted state as obtained from KMS server(s) 110 may be stored on memory 106 and/or on another data storage device set to temporarily store the decrypted keys, for example, a cache, volatile memory, and/or data storage device with a mechanism to remove the decrypted keys after a certain event (e.g., amount of time, certain number of encryption/decryption cycles) has elapsed.

Optionally, decrypted account key dataset 154 is locally stored on another data storage device in communication with data storage device 106, for example, another memory (e.g., volatile) and/or cache. The other data storage device may be another physical device, and/or a virtual device created by a virtual division of data storage device 106 into at least two virtual storage devices. Data storage device 106 and/or the other data storage device may be locally installed with respect to the processor 102 for providing fast access times. Data storage device 106 and/or the other data storage device are not accessible to KMS server 110, which provides additional security.

Computing device 104 may include a data storage device 116 for storing data, for example one or more of: a dataset storing encrypted data 154 which may store data of one or more user accounts, and/or encrypted key dataset 152 which stores one or multiple encrypted keys per user account. Data storage device 116 may provide fast access to data stored thereon, for example, in comparison to storing the data on a slow access device such as a distance storage server that experiences long read times and/or delays in transport. Data storage device 116 may be implemented as, for example, a memory, a local hard-drive, virtual storage, a removable storage unit, an optical disk, and/or a storage device.

Network 114 may be implemented as, for example, the internet, a local area network, a virtual private network, a wireless network, a cellular network, a local bus, a point to point link (e.g., wired), and/or combinations of the aforementioned.

Computing device 104 may include a network interface 118 for connecting to network 114, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 104 may connect using network 114 (or another communication channel, such as through a direct link (e.g., cable, wireless) and/or indirect link (e.g., via an intermediary computing unit such as a server, and/or via a storage device) with one or more of:

KMS server(s) 110 which hosts KMS 110B and stores and/or manages organizational keys (e.g., stored in organization key dataset 110A) used to encrypt and/or decrypt data. Optionally, multiple different KMSs are used to provide redundancy in case of failure. For example, each KMS is provided the same account key, for encryption using a different organization key, to create multiple encrypted versions of the same account key, which provide redundancy to the account key, as described herein.

Client terminal(s) 112, which may be used by users accessing their user accounts on computing device 104 for encrypting and/or decrypting data, for example, of dataset 150 associated with the respective client terminal 112.

Computing device 104 and/or client terminal(s) 112 include and/or are in communication with one or more physical user interfaces 108 that include a mechanism for a user to enter data and/or view data (e.g., select data for encryption and/or decryption, view the encrypted and/or decrypted data). Exemplary user interfaces 108 include, for example, one or more of, a touchscreen, a display, a keyboard, a mouse, and voice activated software using speakers and microphone.

Reference is now made to FIG. 2, which is a high level dataflow diagram between exemplary components of an exemplary architecture 200, in accordance with some embodiments of the present invention. Components of architecture 200 may be implemented by, and/or may correspond to, components of system 100 described with reference to FIG. 1. Dataflow between components of architecture 200 may be implemented by, and/or may correspond to, features described with reference to FIG. 3.

A web application 202 is in communication with an application server 204. Web application 202 may be accessed by client terminals. Web application 202 may be installed on client terminals and/or on application server 204. A cipher layer (e.g., middleware) 206 may be implemented on the application and/or consumer side. Cipher layer 206 may handle every request (e.g., get, set) to database 208 (and/or another storage device), which may include a database and/or file system and/or cache, including data for encryption and/or decryption. Cipher layer 206 performs the required cipher operation on the data (e.g., encryption, decryption). To perform the cipher operation, cipher layer 206 calls a cipher service 210 (e.g., microservice).

Cipher service 210 uses an envelope encryption to store and protect account keys. Each user account is assigned a unique account key. The account key is encrypted one or more times using one or more organizational keys stored in KMS 218. The encrypted account key(s) is stored in encrypted account key dataset 216.

Cipher services 210 performs a cipher operation (i.e., encryption or decryption) 214 on an input of data 212 to obtain an output of data 220. The cipher operation 214 is performed by retrieving the encrypted account key from encrypted account key dataset 216. The encrypted account key is decrypted using the organization key on KMS 218. Cipher operation 214 is performed using the decrypted account key. To reduce the overhead caused by calls to KMS 218, cipher service 210 caches the decrypted account key (e.g., in a cache of 208) for a short period of time. If an error occurs when trying to decrypt an encrypted account key, cipher service 210 uses another one of the generated account keys and uses the corresponding organizational key of KMS 218.

Referring now back to FIG. 3, at 302, one or more new account keys are created, optionally in response to a request to set up a new account by a new user. Multiple new account keys may be created, for providing redundancy. An exemplary process for creating new account keys is described with reference to FIG. 4.

Referring now back to FIG. 4, the dataflow diagram described with reference to FIG. 4 is between the following exemplary components, which correspond to and/or are implemented by, components of system 100 described with reference to FIG. 1, and/or components of architecture 200 described with reference to FIG. 2.

Application 402 may be an application (e.g., web application 202) and/or other process, which may be running on a client terminal (e.g., 112), application server (e.g. 204), a web program, and the like.

Cipher service 404 may be running on a server (e.g., 204, 206, 102, 104), accessed by application 402 (e.g., client terminal on which the application is running) over a network (e.g., 114).

Cache 406 (e.g., 106, 208) may be implemented on the server running the cipher service. Cache 406 is an exemplary implementation of a data storage device set for temporary storage of data, and may be implemented using other implementations, for example, as a volatile memory. Dataset of encrypted account keys 408 (e.g., 216, 152) may be implemented on a data storage device accessed by cipher service 404 (and/or by the server on which the cipher service is running), for example, a hard drive, a computing cloud, a memory, and the like.

KMS 410 (e.g., 218, 110, 110B) may be implemented as a third party external server. KMS 410 and one or more organizational keys (used to encrypted and/or decrypt the account key) may alternatively or additionally be implemented by a client terminal running application 402, and/or designated by the user associated with the user account. The user account providing the KMS and organizational keys may be referred to as BYOK (bring your own key).

KMS 410 manages organization keys that are used to encrypt and/or decrypt multiple account keys of one or more user accounts. The same organization key may be used for multiple user accounts. This reduces the total number of organization keys that are managed by the KMS, for example, in comparison to standard approaches where a single organization key is used per user account and/or per account key, which does not scale when there are a large number of user accounts and/or keys.

Cipher service 404 is in local communication with cache 406 and/or dataset of encrypted account keys 408, for example, cache 406 and/or a data storage device storing dataset of encrypted account keys 408 thereon is locally installed within a computing device (e.g., server) running cipher service 404, to provide fast access to the encrypted and/or unencrypted keys. Cipher service 404 is in network communication with application 402 (e.g., running on a client terminal and/or another remote server) and/or is in network communication with KMS 410 (e.g., server hosting the KMS).

At 412, a request for encryption of data for a new user account is provided. The request may be a first time request for the new user account, and/or may be a first time request in the case where no user account currently exists.

At 413, the request for the new user account triggers generation of a new account key. Alternatively or additionally, the request for the new account key is triggered in response to a request to provide key redundancy for the user account (the new user account and/or an existing user account).

At 414, the account key is generated for the user account. Optionally, multiple account keys are generated. An account key ID indicating the generated account keys may be defined and associated with the user account. The account key ID may be used to locate the account key.

The generated account key(s) is in an unencrypted state.

At 416, the account key(s) in the unencrypted state is provided to the KMS.

At 418, the KMS encrypts the account key(s). The KMS may use the same organization key to encrypt multiple account keys, of the same user account, and/or use the same organization key to encrypt one or more account keys of multiple different user accounts.

The KMS may encrypt the same account key a single time to obtain a single encrypted account key. Alternatively, the KMS may encrypt the same account key multiple times, optionally using different unique organizational keys stored and managed by the KMS, to obtain multiple different encrypted versions of the same account key, to provide redundancy for the account key, Decryption of each of the encrypted versions of the same account key using the respective unique organization key generates the same account key, enabling recovery of the account key using a different encrypted account key if the encrypted account key that was used is lost.

At 420, the KMS provides the one or more encrypted versions of the account key(s) over the network, optionally to the cipher service 404.

At 422, the encrypted account key(s) are stored in the account key dataset in association with the user account. The encrypted account key(s) may be stored using the account key ID associated with the user account, for example, the account key ID may be serve as an index for fast lookup in a database of encrypted account keys.

Referring now back to FIG. 3, at 304, data is encrypted and/or decrypted. The data is associated with the user account, for example, provided by a client terminal of a user using the user account, and/or located on a remote device and designated by a user using the user account, and/or automatically provided by a process running on a remote server that accesses the user account.

Optionally, the data is encrypted using an ad-hoc initialization vector for ensuring (and/or verifying) that the same data designated for encryption generates two different encrypted data items.

Referring now back to FIG. 5, the dataflow diagram described with reference to FIG. 5 is between the exemplary components described with reference to FIG. 4, which correspond to and/or are implemented by, components of system 100 described with reference to FIG. 1, and/or components of architecture 200 described with reference to FIG. 2.

At 512, data for encryption/or and decryption is accessed and/or provided. The data is associated with a certain user account of multiple user accounts. The data is accessed and/or provided by application 402.

When the data is encrypted data for decryption, an account key ID is attached to the encrypted data. The account key ID is attached to the encrypted data during the encryption of the data, as described with reference to 526.

At 514, the data for encryption/or and decryption is obtained by cipher service 404.

At 516, cipher service 404 accesses cache 406 (or other temporary data storage device, such as volatile memory) to determine whether a decrypted account key associated with the certain user account. The decrypted account key may have been previously placed on the cache in response to encryption and/or decryption of a previous data item for which no decrypted account key existed on the cache.

At 518, when no decrypted account key exists on the cache, the dataflow continues to 520 for obtaining the decrypted key. Alternatively, when the decrypted account key exists on the cache, the dataflow continues to 526, for encrypting and/or decrypting the data using the decrypted account key obtained from the cache. The KMS server is not accessed to obtain the account key.

At 520, an account key in an encrypted state is obtained from account key dataset 408. Account key dataset 408, optionally implemented as a database, stores one or more encrypted account keys for each user account. The one or more encrypted keys may be of the same account key, encrypted using different organization keys, to provide redundancy.

When the data is for encryption, the encrypted account key may be obtained from the account key dataset according to an account key ID associated with the user account, for example, the account key ID serves as an index for fast loop-up and retrieval of the encrypted account key.

When the data is encrypted data for decryption, the account key ID attached to the encrypted data (e.g., as in 526) is extracted. The account key is obtained from the account key dataset using the extracted account key ID, for example, using the extracted account key ID for fast loop-up and retrieval of the encrypted account key from the account key dataset.

The encrypted account key is provided over the network to KMS 410.

At 522, the KMS 410 decrypts the encrypted account key using an organization key stored and managed by the KMS. The organization key used to decrypt the encrypted account key was used to create the encrypted account key, by previously encrypting the account key in the decrypted state.

At 524, the decrypted account key is received over the network from the KMS. The decrypted account key is stored in cache 406.

At 526, the data is encrypted and/or decrypted using the decrypted account key.

When the data is being encrypted, the account key ID is attached to the encrypted data.

At 528, the encrypted and/or decrypted data is provided to application 402, and/or to another process and/or device.

Referring now back to FIG. 3, at 306, additional data item(s) associated with the same user account may be encrypted and/or decrypted using the same decrypted account key (used to encrypt and/or decrypt the data obtained in 304), which is stored in the data storage device (e.g., memory, volatile memory, cached).

The additional data item(s) are encrypted and/or decrypted without accessing the KMS for performing additional decryptions of the account key. Using the same decrypted key without accessing the KMS, increases computational performance and/or improves data storage utilization, of the computing device performing the encryption and/or decryption and/or of the KMS.

The additional data item(s) are encrypted and/or decrypted using the same decrypted account key as long as the decrypted account key is retained on the data storage device. The data storage device temporarily retains the decrypted account key.

At 308, one or more decrypted account keys temporarily stored on the data storage device are removed, deleted, and/or otherwise made inaccessible. Removing the decrypted account keys improves security, by reducing likelihood of a malicious entity accessing the decrypted account keys in the limited time the decrypted keys are available on the data storage device.

The decrypted account keys may be removed, for example, when all pending data items (e.g., in a queue) of the user account have been encrypted and/or decrypted, according to a timer, according to a manual indication provided by a user, and/or according The temporary storage of the decrypted account keys (i.e., removal of the decrypted account keys) may be controlled, for example, by one or more of: an eviction policy (e.g., cache eviction policy) for evicting decrypted account keys stored thereon, reset of the data storage device (e.g., volatile memory) at a preset event (e.g., timer, when user account is inactive) for deleting decrypted account key stored thereon, a mechanism set to remove decrypted account key stored therein on when a timer expires, and a manual trigger set to remove decrypted account keys stored thereon in response to a manual indication by a user.

At 310, an error and/or a security breach and/or loss of one or more of the encrypted account keys may be detected. The error may be, for example, KMS being down, KMS unavailable, or other issue communicating with the KMS. The security breach may be, for example, another user account having the same account key, or an attempted decryption of the encrypted account key by an unauthorized entity.

In response to the detected error and/or security breach, another one of the encrypted versions of the account key is used instead. The other encrypted version is of the same account key, which has been encrypted using a different organization key by the KMS. The same account key, when decrypted, may be used to decrypt data encrypted by the account key for which the error and/or security breach has been detected.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant account keys and KMSs will be developed and the scope of the terms account key and KMS is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of at least one of encrypting and decrypting data, comprising:
   accessing data for at least one of encryption and decryption, wherein the data is of a user account of a plurality of user accounts;
   obtaining an account key in an encrypted state, the account key is obtained from an account key dataset storing at least one encrypted account key for each of the plurality of user accounts;
   providing over the network, the encrypted account key to at least one key management system (KMS) hosted by a server;
   receiving over the network, a decrypted account key from the server hosting the at least one KMS, wherein the at least one KMS decrypts the encrypted account key using an organization key stored and managed by the at least one KMS;
   storing the decrypted account key in a data storage device set to provide temporary storage for decrypted account keys;
   at least one of encrypting and decrypting the data associated with the user account using the decrypted account key;
   generating the account key for the user account, wherein the account key comprises a new account key for the user account;
   providing over the network, the new account key to the at least one KMS, wherein the new account key is in a decrypted state;
   receiving over the network, at least one encrypted versions of the new account key, each respective encrypted version of the new account key created by the at least one KMS using a respective unique organizational key stored and managed by the KMS;

storing the at least one encrypted versions of the new account key in the account key dataset in association with the user account;

detecting at least one of an error and a security breach of one of the encrypted versions of the new account key; and in response to the detected at least one of error and security breach, using another of the encrypted versions of the new account key;

wherein the at least one encrypted versions of the new account key provide redundancy for the account key;

wherein the at least one of error and a security breach is detected in response to attempted decryption of the encrypted account key.

2. The computer implemented method of claim 1, wherein the data storage device set to provide temporary storage is implemented as at least one of: a cache, and a volatile memory.

3. The computer implemented method of claim 1, wherein the organizational key is used to encrypt and decrypt a plurality of account keys of a plurality of user accounts.

4. The computer implemented method of claim 1, wherein the at least one KMS and the organizational key are provided by the user account.

5. The computer implemented method of claim 1, wherein the data storage device set to provide temporary storage includes at least one of: an eviction policy for evicting decrypted account keys stored thereon, reset of the data storage device at a preset event for deleting decrypted account key stored thereon, a mechanism set to remove decrypted account key stored therein on when a timer expires, and a manual trigger set to remove decrypted account keys stored thereon in response to a manual indication by a user.

6. The computer implemented method of claim 1, wherein decryption of each of the at least one encrypted version of the new account key using the respective unique organization key generates a same key.

7. The computer implemented method of claim 1, further comprising using the same decrypted account key stored in the data storage device, to at least one of encrypt and decrypt a plurality of data items associated with the user account, without performing additional decryptions of the account key by the at least one KMS for the plurality of data items.

8. The computer implemented method of claim 1, wherein encrypting the data comprises encrypting the data using an ad-hoc initialization vector for ensuring that a same data for encryption generates two different encrypted data items.

9. The computer implemented method of claim 1, wherein at least one of:
   (i) when the data is for encryption, the account key is obtained from the account key dataset according to an account key ID associated with the user account, and the account key ID is attached to the encrypted data, and
   (ii) when the data comprises encrypted data for decryption, the account key ID attached to the encrypted data is extracted, and the account key is obtained from the account key dataset using the extracted account key ID.

10. The computer implemented method of claim 1, wherein in response to the decrypted account key existing in the data storage device, the data is at least one of encrypted and decrypted using the decrypted account key without obtaining the account key in an encrypted state.

11. A system for at least one of encryption and decryption of data, comprising:

at least one hardware processor executing a code for:

accessing data for at least one of encryption and decryption, wherein the data is of a user account of a plurality of user accounts;

obtaining an account key in an encrypted state, the account key is obtained from an account key dataset storing at least one encrypted account key for each of the plurality of user accounts;

providing over the network, the encrypted account key to at least one key management system (KMS) hosted by a server;

receiving over the network, a decrypted account key from the server hosting the at least one KMS, wherein the at least one KMS decrypts the encrypted account key using an organization key stored and managed by the at least one KMS;

storing the decrypted account key in a data storage device set to provide temporary storage for decrypted account keys;

at least one of encrypting and decrypting the data associated with the user account using the decrypted account key;

generating the account key for the user account, wherein the account key comprises a new account key for the user account;

providing over the network, the new account key to the at least one KMS, wherein the new account key is in a decrypted state;

receiving over the network, at least one encrypted versions of the new account key, each respective encrypted version of the new account key created by the at least one KMS using a respective unique organizational key stored and managed by the KMS;

storing the at least one encrypted versions of the new account key in the account key dataset in association with the user account;

detecting at least one of an error and a security breach of one of the encrypted versions of the new account key; and in response to the detected at least one of error and security breach, using another of the encrypted versions of the new account key;

wherein the at least one encrypted versions of the new account key provide redundancy for the account key;

wherein the at least one of error and a security breach is detected in response to attempted decryption of the encrypted account key.

12. The system of claim 11, wherein the at least one hardware processor is of at least one server providing software as a service (SAAS) for encryption and decryption of data associated with the user account over a network to a plurality of client terminals.

13. The system of claim 11, wherein the data for at least one of encryption and decryption is not transferred over the network between the at least one hardware processor and the server hosting the at least one KMS, wherein the data for at least one of encryption and decryption is shared between a plurality of processors and not stored locally by any of the plurality of processors.

14. The system of claim 11, wherein the at least one of encryption and decryption of the data associated with the user account is performed by the at least one processor, wherein the at least one of encryption and decryption of the data associated with the user account is not performed by the at least one KMS.

15. The system of claim 11, wherein the data storage device comprises a first data storage device, wherein the account key dataset is locally stored on a second data storage device, wherein the first and second data storage devices are locally installed with respect to the at least one hardware processor for providing fast access times, wherein the first and second data storage devices are not accessed by the server hosting the at least one KMS.

16. A non-transitory medium storing program instructions for at least one of encryption and decryption of data, which, when executed by a processor, cause the processor to:
   access data for at least one of encryption and decryption, wherein the data is of a user account of a plurality of user accounts;
   obtain an account key in an encrypted state, the account key is obtained from a key dataset storing at least one encrypted account key for each of the plurality of user accounts;
   provide over the network, the encrypted account key to at least one key management system (KMS) hosted by a server;
   receive over the network, a decrypted account key from the server hosting the at least one KMS, wherein the at least one KMS decrypts the encrypted account key using an organization key stored and managed by the at least one KMS;
   store the decrypted account key in a data storage device set to provide temporary storage for decrypted account keys;
   at least one of encrypt and decrypt the data associated with the user account using the decrypted account key;
   generating the account key for the user account, wherein the account key comprises a new account key for the user account;
   providing over the network, the new account key to the at least one KMS, wherein the new account key is in a decrypted state;
   receiving over the network, at least one encrypted versions of the new account key, each respective encrypted version of the new account key created by the at least one KMS using a respective unique organizational key stored and managed by the KMS;
   storing the at least one encrypted versions of the new account key in the account key dataset in association with the user account;
   detecting at least one of an error and a security breach of one of the encrypted versions of the new account key; and
   in response to the detected at least one of error and security breach, using another of the encrypted versions of the new account key;
   wherein the at least one encrypted versions of the new account key provide redundancy for the account key;
   wherein the at least one of error and a security breach is detected in response to attempted decryption of the encrypted account key.

* * * * *